United States Patent [19]

Black et al.

[11] 4,326,433
[45] Apr. 27, 1982

[54] HYDRAULICALLY CONTROLLED POWER TRANSMISSION HAVING FRICTION PLATE CLUTCHES FOR SELECTIVELY ENGAGING A PLURALITY OF CHANGE SPEED GEARS

[75] Inventors: James B. Black, Roscoe, Ill.; Darwin D. Behlke, Kenosha; Horst G. Steinhagen, Racine, both of Wis.

[73] Assignee: Twin Disc, Incorporated, Racine, Wis.

[21] Appl. No.: 73,508

[22] Filed: Sep. 7, 1979

[51] Int. Cl.³ .................... F16H 35/00; F16H 5/28
[52] U.S. Cl. .................... 74/740; 74/752 C; 74/364; 74/335; 251/138; 137/625.15
[58] Field of Search ............ 74/640, 752 C, 364, 74/820, 740, 335; 251/138, 58; 137/625.15, 625.11

[56] References Cited

U.S. PATENT DOCUMENTS

| | | | |
|---|---|---|---|
| 2,088,427 | 7/1937 | Maurer | 74/752 C |
| 2,204,919 | 6/1940 | Tyer | 74/752 C |
| 2,360,695 | 10/1944 | Linden et al. | 137/625.46 |
| 2,609,706 | 9/1952 | Jandasek | 74/752 C |
| 2,728,242 | 12/1955 | De Vlieg | 74/364 |
| 3,151,718 | 10/1964 | Temple | 137/625.11 |

FOREIGN PATENT DOCUMENTS

| | | | |
|---|---|---|---|
| 566630 | 11/1958 | Canada | 74/364 |
| 1224837 | 12/1958 | France | 74/820 |

*Primary Examiner*—Kenneth Dorner
*Attorney, Agent, or Firm*—James E. Nilles

[57] ABSTRACT

A hydraulically controlled transmission for vehicles such as heavy-duty, high horsepower, off-highway trucks, the transmission having a plurality of selectively engagable change speed gears and hydraulically actuated friction type clutches for selectively engaging the gears to provide various speed ratios for the vehicle. The transmission includes a hydraulic control circuit in communication with the clutches and a rotary range selector valve is located in the circuit and driven in step-by-step increments by a geneva wheel drive means. The arrangement insures that the transmission can be shifted at only one speed range at a time and that an engaged speed range will be released before another speed range is engaged.

8 Claims, 20 Drawing Figures

FIG.4

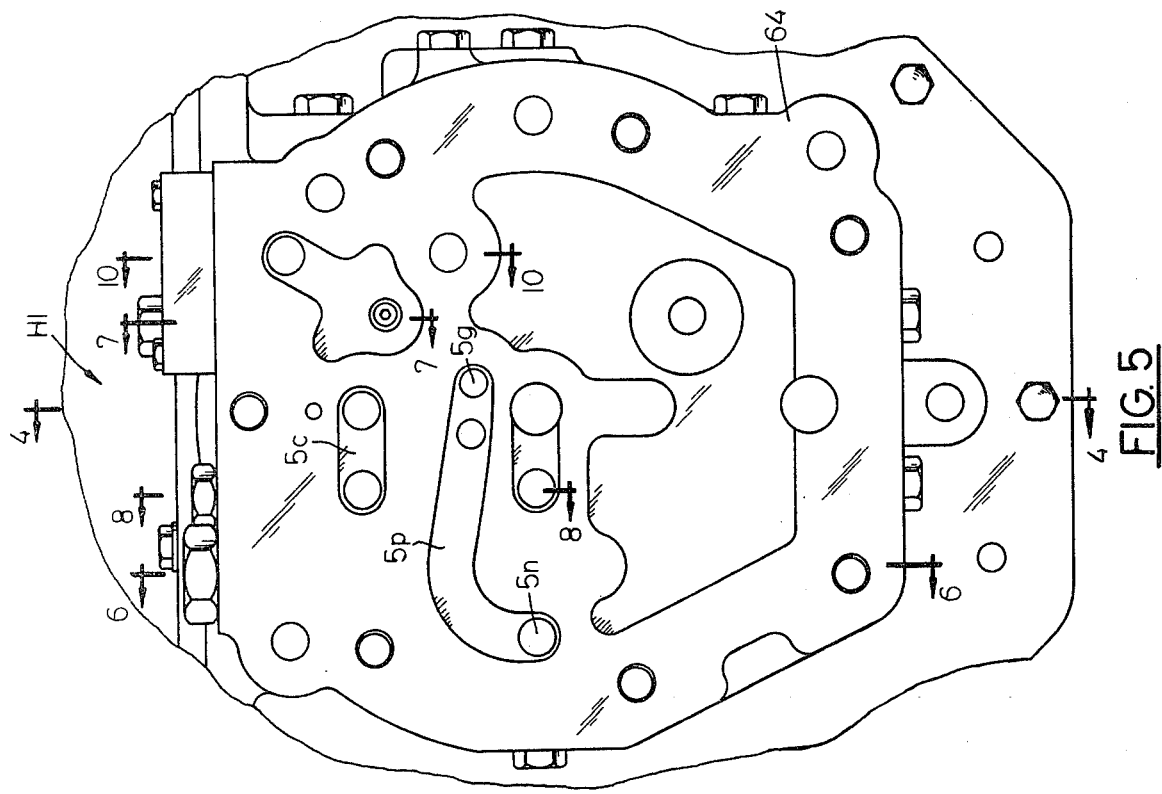
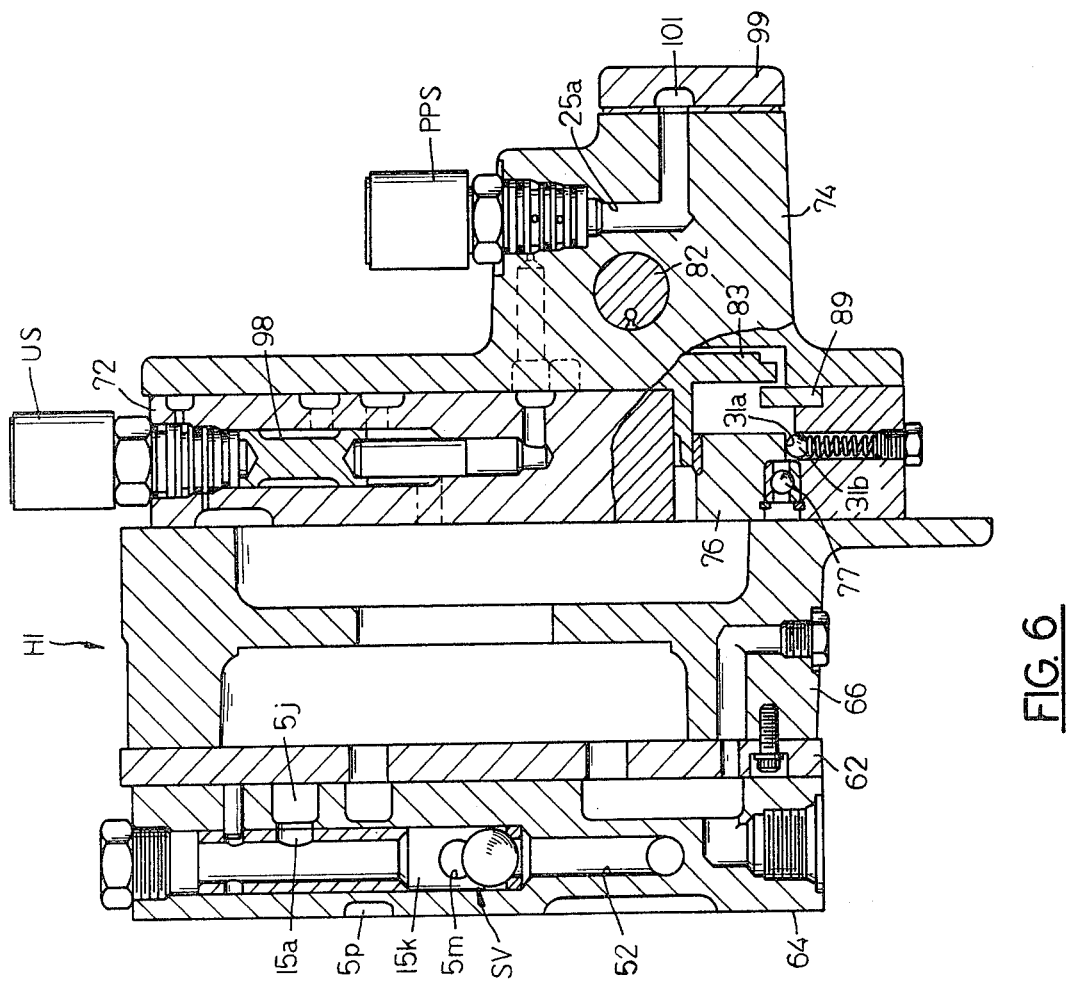

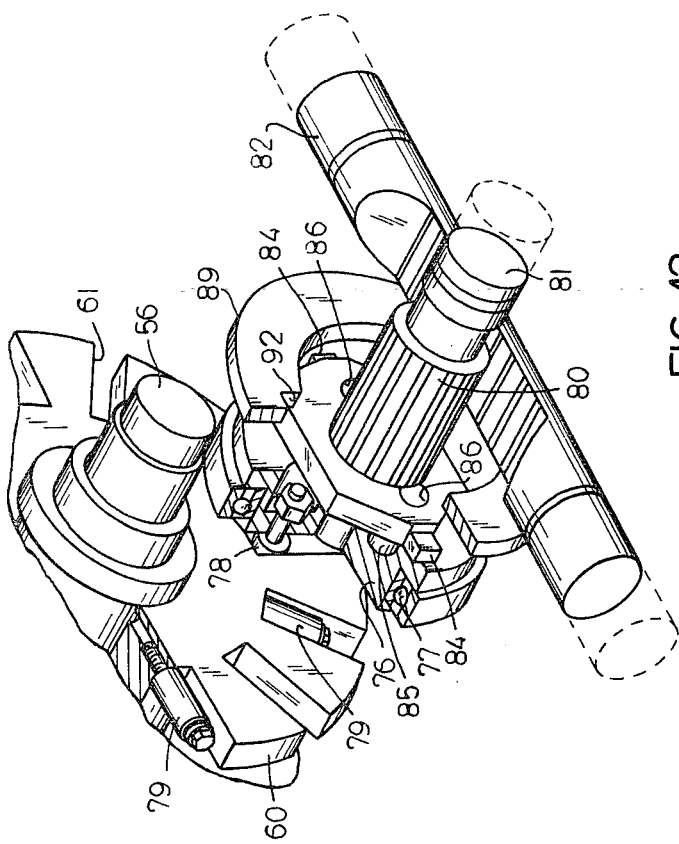
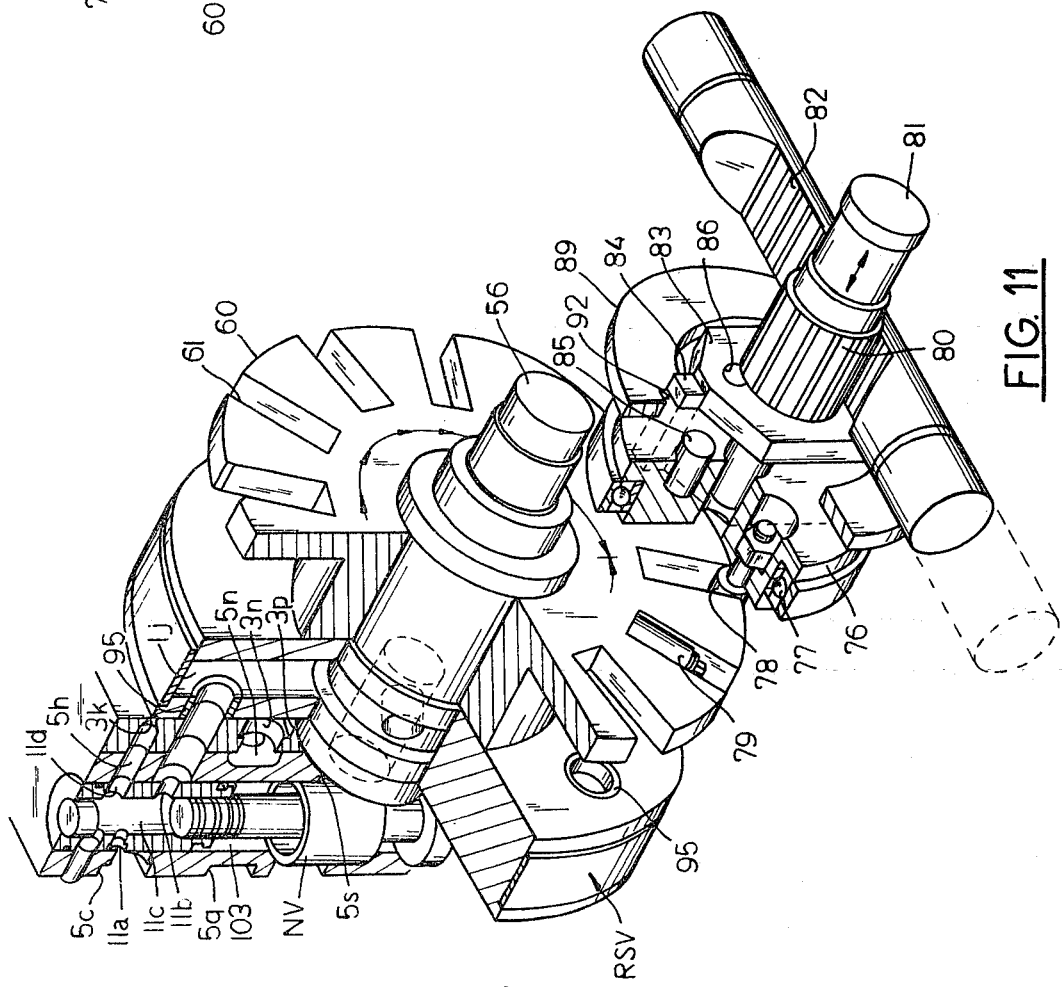
FIG. 12
FIG. 11

HYDRAULICALLY CONTROLLED POWER TRANSMISSION HAVING FRICTION PLATE CLUTCHES FOR SELECTIVELY ENGAGING A PLURALITY OF CHANGE SPEED GEARS

BACKGROUND OF THE INVENTION

The present invention pertains to hydraulically actuated transmissions having various change speed gear ratios, the gears of which are selectively actuated by hydraulically operted friction clutches. These prior art transmissions have had some shortcomings such as the inability to insure that smooth shifting between speed ranges occurs and particularly that only one speed range at a time is selected, and before one speed range is engaged all others are released. Other shortcomings of these prior transmissions have occured when electric power or logic failure occurs and the transmission is left in a particular speed range in one direction or another; a malfunction of the parts may occur when it is attempted to again start the transmission with a particular speed range in the engaged position.

One example of a prior art arrangement for hydraulic gear shifting and driving system is shown in the U.S. Pat. No. 2,360,695 issued Oct. 17, 1944 to Linden et al. That device used grooved cylindrical rotating elements with indexing means for moving the major gear change element through a portion of a revolution while the minor gears change valve element is completely revolved. This device used a geneva gear element with nontangential notches relative to the path of the driving arm pin which produces shock during transmission of force and limited the device to very slow shifts to prevent premature failure of the parts. It also had a complex detent roller and pivoted arm arrangement for locking against rotation.

Another example of the prior art is the U.S. Pat. No. 2,498,189 issued Feb. 21, 1950 to Wattson for automatic control and distribution of fluids. That device used a gear motor with a large speed reduction driving a pinion having an incomplete complement of circularly spaced teeth and a secondary gear and a distribution gear, all of which resulted in very slow responding shifts and relies on friction to prevent the bell from over-shooting a fluid outlet or drifting from its position at the fluid outlet, since it lacked the positive means for indexing and holding the bell in position.

SUMMARY OF THE PRESENT INVENTION

The present invention provides a hydraulically controlled transmission for vehicles such as heavy-duty, high horsepower, off-highway trucks and which transmission has a plurality of selectively engagable change speed gears that are selectively engaged by means of hydraulically actuated friction type clutches. The invention contemplates a hydraulic control mechanism including a hydraulic circuit having a rotary range selector valve for selectively distributing pressure fluid to the desire clutch. A drive means is provided for the range selector valve which insures that the transmission is only shifted one speed range at a time and which furthermore insures that an engaged speed range will be released before another speed range is selected. A more specific aspect of the invention relates to a geneva wheel and rack and pinion drive therefor which rotate the range selector valve in step-by-step increments. Furthermore, blocker means are provided for preventing rotation of the geneva wheel and consequently the range selector valve and thereby preventing engagement or disengagement of the clutch, unless the rack and pinion drive means for the geneva wheel is in a proper predetermined position. The arrangement is such that the time between releasing one range clutch and engaging another is minimal, thereby providing extremely fast shifts of the transmission. Upon start-up or restoration of the hydraulic power, the transmission must be shifted to the neutral position before any speed ranges can be engaged. Furthermore, in case of an electric power or logic failure the transmission will remain in the last engaged range, unless the transmission happened to be in the reverse range. In the event of an electric power or logic failure when the transmission is in the reverse range, the transmission will automatically release the reverse clutch and stop the transmission of power to the output shaft. After the failure is corrected, the transmission must then be shifted to the neutral position before it can be shifted to either the reverse range or first range forward position.

More specific aspects of the invention are to provide a single rotating valve element which is indexed by a geneva drive and which has a set of ports set on one face to control small ratio changes and a set of ports on the opposite face to control large ratio changes as well as directional changes and neutral. The geneva drive actuator with the geneva wheel slots tangential to the path of the geneva drive pins produces smooth transmission of forces for very fast shifts. The arrangement uses two geneva drive pins for the geneva drive so that the geneva wheel is self-locking against rotation when being back-driven. The two pins automatically index the rotary selector valve since a lightly loaded detent holds the geneva drive and pins in position.

These and other objects and advantages of the present invention will appear hereinafter as this disclosure progresses, reference being had to the accompanying drawings.

THE DRAWINGS

FIG. 4 is a sectional view taken generally along the line 4—4 in FIG. 2, but on an enlarged scale and showing the range selector valve of the present invention, the geneva drive mechanism, the geneva drive clutch and the rack and pinion and also showing the neutral valve;

FIG. 5 is a sectional view taken generally along the line 5—5 in FIG. 4 and showing the mounting face plate of the valve assembly shown in FIG. 4;

FIG. 6 is a sectional view taken generally along the line 6—6 in FIG. 5 and showing the shuttle valve, the pilot valve and its upshift solenoid and the pre-positioning solenoid;

FIG. 11 is a fragmentary perspective view, certain parts being shown broken away or in section of the range selector valve, the geneva drive, the clutch, the rack and pinion and the neutral valve assembly of the present invention, the rotary selector valve being shown in the neutral position and the clutch disengaged;

FIG. 12 is a view similar to FIG. 11, but only showing a portion thereof and further showing the range selector valve located one-half between neutral and reverse with the pinion engaged;

DESCRIPTION OF A PREFERRED EMBODIMENT

Figure 1:
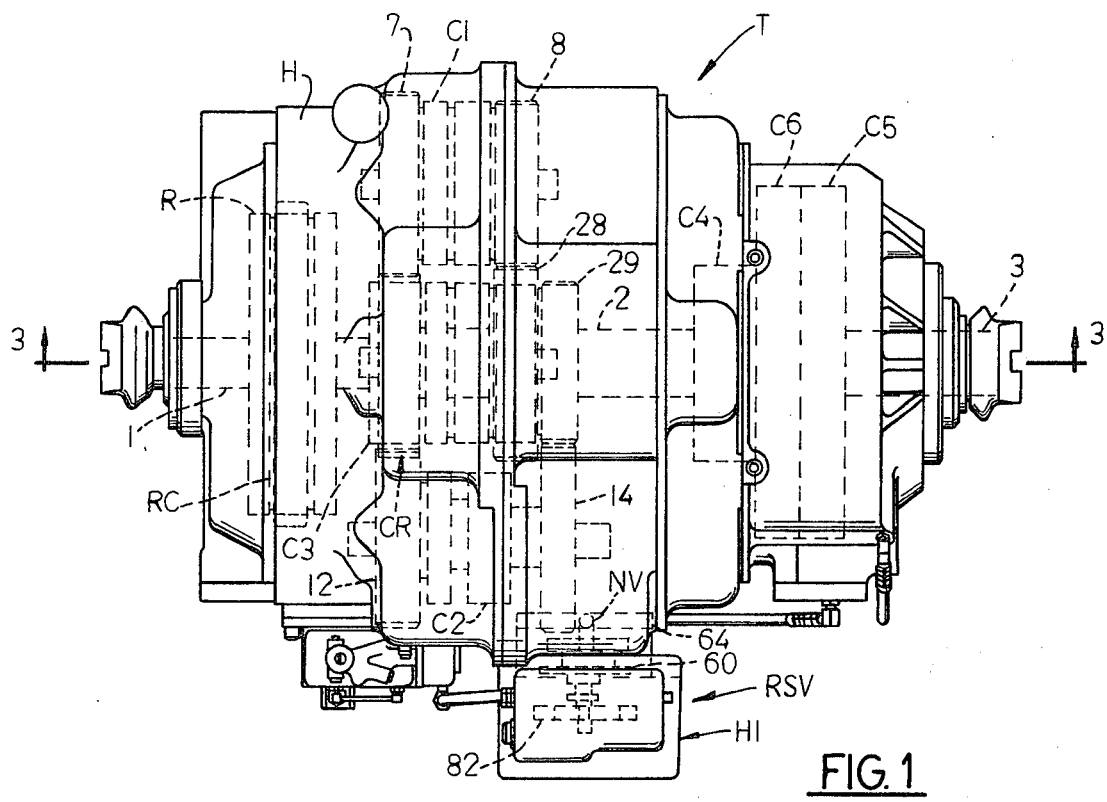
FIG. 1 is a plan view of a transmission assembly embodying the present invention.

Various multi-speed power transmissions may be utilized with the present invention, but the one shown and described in connection with the invention is a nine speed transmission T which finds particular utility in heavy-duty, high horsepower, off-highway trucks. The present invention utilizes conventional hydraulically actuated friction plate type clutches in combination with various gears to provide different speed ratios in both forward and also in a reverse direction.

The transmission has nine forward ranges, a neutral or startup range, and one reverse range. A first series of clutches consist of three countershaft clutches C1, C2 and C3 and the reverse clutch CR, and a second series of clutches consist of three planetary clutches C4, C5 and C6. The two series of clutches are interconnected by various gear ratios and one clutch from each series must be engaged in order to transmit power from the input to the output.

More specifically, the transmission has a first series of clutches C1, C2 and C3 and the reverse clutch CR. The transmission specifically includes a power input shaft 1, which is driven by a torque converter TC (FIG. 15) and from a prime mover PM such as an internal combustion engine, and also includes an intermediate shaft 2 piloted at its forward end 2a in the rear end of the power input shaft 1. An output shaft 3 is then piloted at its front end in anti-friction bearings in the rear end of the intermediate shaft 2 as clearly shown. A hydraulically actuated friction type clutch C1 is mounted on a shaft 5 suitably journalled in the fixed housing H of the transmission and has gears 7 and 8, respectively, at each side thereof. Gear 7 is fixed on shaft 5. Gear 8 is journalled on shaft 5 and is welded to drive ring 9 of clutch C1 in the known manner. A second clutch C2 is provided on another shaft 10 also journalled in the housing and another pair of gears 12 and 14 are located on the shaft 10. Gear 12 is fixed on shaft 10. Gear 14 is journalled on shaft 10 and is welded to the drive ring 15 of the clutch C2.

The transmission also includes a central, hydraulically actuated, lock-up friction clutch C3 mounted on and between shafts 1 and 2. When engaged, clutch C3 locks shaft 1 and 2 directly together. When clutch C3 is disengaged, power from shaft 1 is delivered through clutch C1, clutch C2 or clutch CR. Regarding clutch C3, the clutch piston carrier 20 is splined to shaft 1 at 21 and its gear periphery is in constant mesh with gears 7 and 12. The clutch hub member 22 is splined to shaft 2. Suitable and conventional pistons 24, 24a and 25 are mounted in their respective piston assembly housing of each clutch C1, CR and C2 and pressurization of the actuating chamber formed between the pistons and their housings urge the pistons in an axial direction to cause clamp up of the intermediate friction plates of their respective clutches, in the known manner. Gear 28 is fixed on shaft 2 and is in constant mesh with gears 8 and 8a. Gear 29 is fixed on shaft 2 and is in constant mesh with gear 14.

Figures 3, 3A:
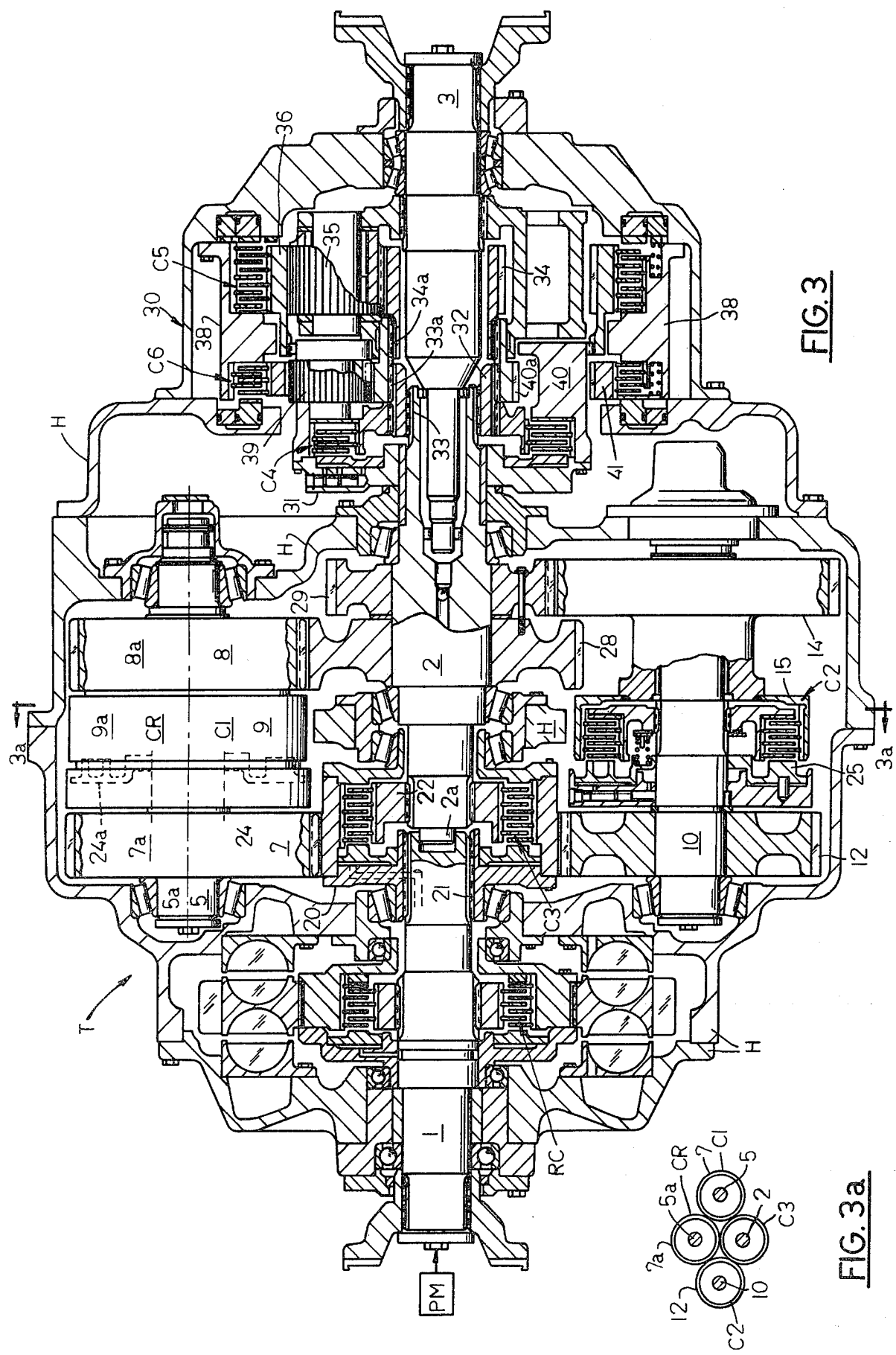
FIG. 3 is a longitudinal, cross sectional view with certain parts broken away or in section for the sake of clarity; the view being taken generally along line 3—3 in FIG. 1, but on an enlarged scale.
FIG. 3A is a transverse section view taken along line 3A—3A in FIG. 3, but on a reduced scale and in schematic form.

Another clutch CR which is shown in the broke-out section behind clutch C1 in FIG. 3 has an input gear 7a that is in constant mesh with gear 7. Gear 7a is fixed to shaft 5a. Gear 8a is journalled on a shaft 5a and is welded to the drive ring 9a of clutch CR. Gear 8a is in constant mesh with gear 28. Since the power train is from the gear periphery of piston carrier 20 to gear 7, to gear 7a, through clutch CR, out gear 8a, to gear 28; shaft 2 rotates in the opposite direction as shaft 1 thus provides reverse.

The various above gears intermesh with one another as shown and act to provide three forward speed ratios and also reverse and deliver them to a second series of clutches in a planetary system 30 located rearwardly in the transmission.

More specifically, a central clutch C4 has its piston housing 31 fixed to the planet carrier 40 and is mounted in part on the rear end of shaft 2 and a sleeve 32 is splined at 33 to the rear end of shaft 2 and is splined at 33a to a sun gear 40a. Sun gear 40a is splined to sun gear 34 at 34a. A number of planet gears 35 are arranged around the sun gear 34 and mesh with an internal ring gear 36.

Another clutch C5 has its interleaved friction plates splined, respectively, to the large internal gear 36 and to the stationary housing portion 38.

Another hydraulically actuated friction clutch C6 has its interleaved friction plates splined, respectively, to the housing member 38 and to internal ring gear 41 around planet gears 39 that are journalled on the carrier 40.

It is believed sufficient to say that when combinations of clutches are engaged, various speed ratios are obtained. For example, when clutch C1 is engaged, it contributes to 1st, 4th and 7th speeds; clutch C2 provides for 3rd, 6th and 9th gear speeds; clutch C3 provides for 2nd, 5th and 8th gear speeds; clutch C4 provides for 7th, 8th and 9th gear speeds; clutch C5 provides for reverse, 1st, 2nd and 3rd gear speeds; clutch C6 provides for 4th, 5th and 6th gear speeds, and clutch CR provides for reverse.

In summary, there are two series of clutches, (1) the four countershaft clutches C1, C2, C3 and CR and (2) the three planetary clutches C4, C5 and C6. One clutch from each series is engaged simultaneously to transmit power.

The transmission shown also includes a hydraulic retarder R having a clutch RC by means of which it is connected to the power shaft 1. As this retarder, its clutch and operation form no part of the present invention, a further description of them will not be made.

A general description of the present invention will now be made to the purpose of orientating the various major component parts thereof, particularly with reference to FIGS. 4, 6, 11, 12, 14 and 15.

Figure 15:
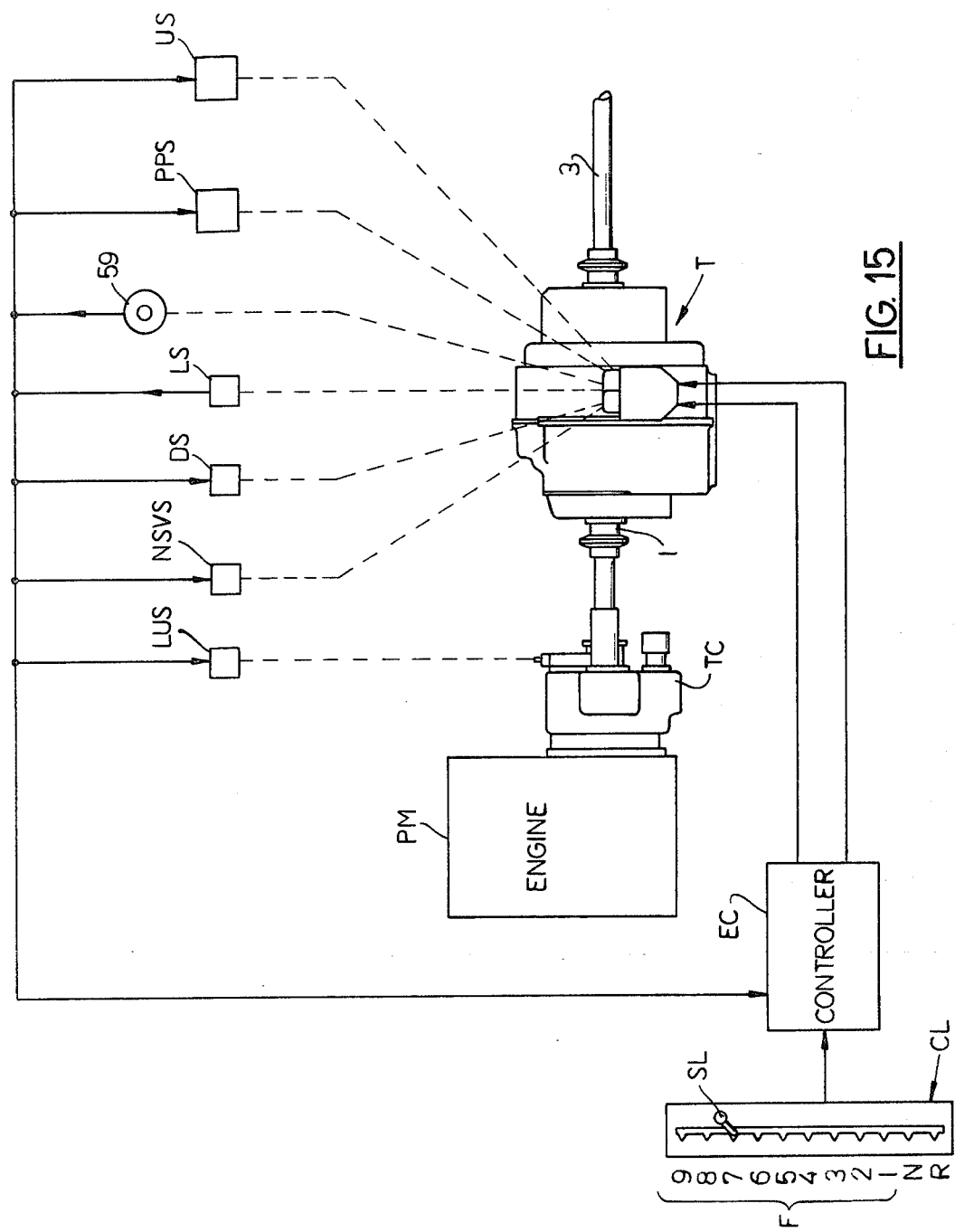
FIG. 15 is a schematic electrical diagram showing some components of the invention.

As FIG. 15 schematically shows, a typical system incorporating a power transmission T in accordance with the invention includes a prime mover PM, such as an internal combustion engine for driving the transmission to supply power to power output shaft 3. The aforementioned clutches in the transmission are operated by the range selector valve which is operated by four solenoid valves designated as follows and hereinafter described in detail: a neutral safety valve solenoid valve NSVS; a pre-positioning solenoid valve PPS; an up or up-shift solenoid valve US; and a down or downshift solenoid valve DS. The solenoid coils of these solenoid valves, as well as a lock-up solenoid valve LUS, are connected to and operate in response to electrical signals received from an electronic controller EC, the particular form of which is not part of the present invention but which is understood to incorporate electronic logic circuitry. The controller EC receives electrical input signals to effect properly timed operation and sequencing of the solenoid valves from several sources, including, for example, an operator's control lever assembly CL; a limit switch LS and a rotary switch 59 which are incorporated in the transmission, as hereinafter explained; and a speed sensing device SS connected to respond to the speed of the power output shaft PO. The operator's control lever assembly CL includes a manually operable shift lever SL which is movable from neutral position N to reverse position R or to any one of nine forward positions F1 through F9. Such positioning of shift lever SL provides appropriate electrical input signals indicative of shift lever position to the controller EC and the latter provides appropriate output signals to operate the transmission clutches.

The control mechanism is mounted in a housing H1 which in turn is secured to the main transmission housing H by cap bolts 51 and having interconnecting fluid passages to be referred to therebetween and by means of which pressure fluid is communicated between the control mechanism and the various hydraulically actuated clutches of the transmission shown clearly in FIG. 3 and previously described.

A shaft 56 is rotatably journalled within the housing H1 and the rotating range selector valve RSV is secured thereon for rotation therewith. The shaft 56 and valve RSV are journalled on bearings 57 and 58. A geneva wheel 60 having a series of circumferentially spaced and radially extending open slots 61 is also fixed to the shaft 56 by key 63 and is secured to valve RSV by pin 63a for rotation therewith. An electrical rotary switch 59 is connected to the end of shaft 56 and provides feedback to a controller and tells it the range which the valve RSV is in, as will appear.

Figure 14:
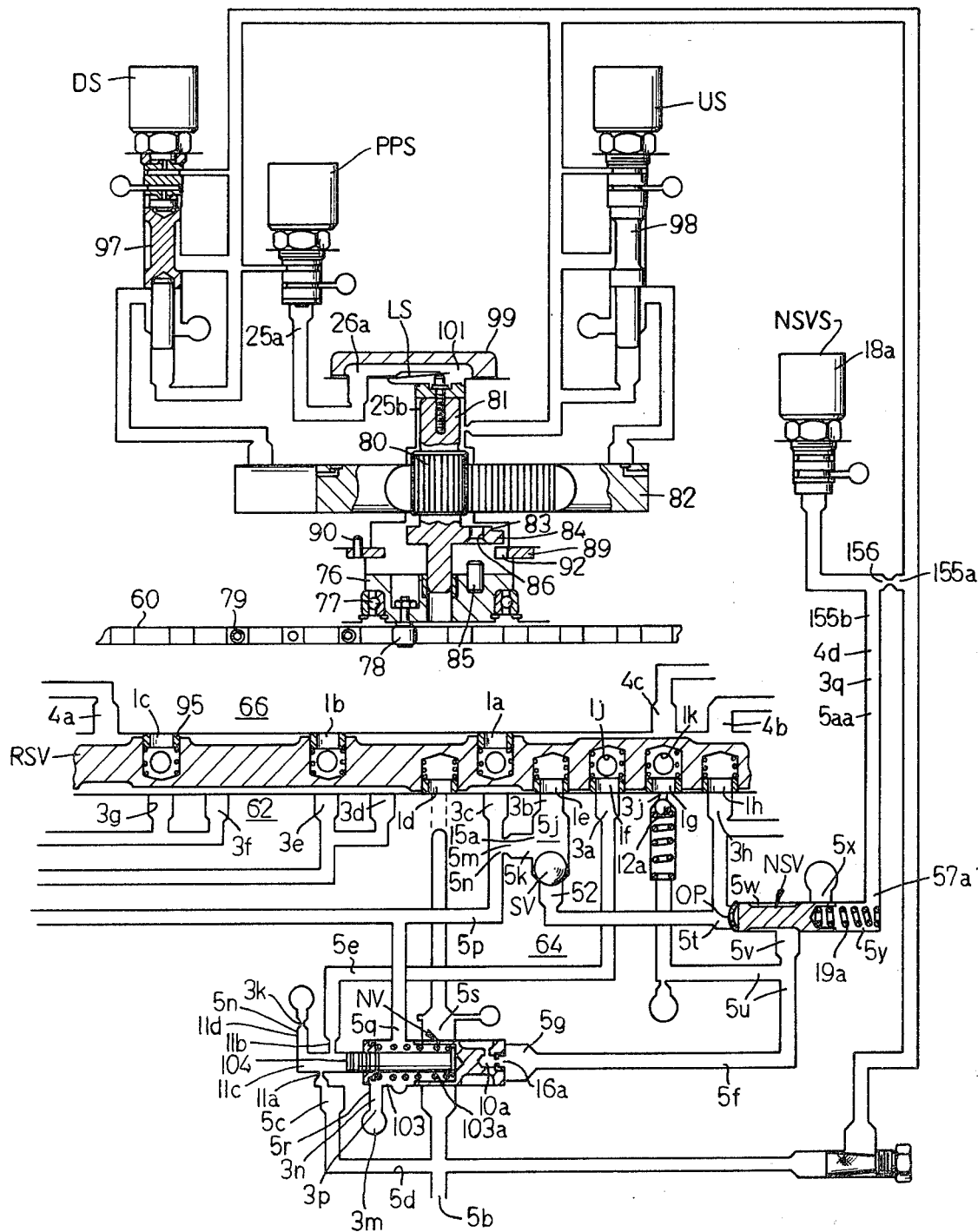
FIG. 14 is a schematic diagram of a portion of the hydraulic circuit including the range selector valve, the solenoid operated rack and gear means, the clutch means, the neutral valve, and the neutral safety valve.

The range selector valve is in fluid communication with various passages to be described in a fixed base plate 62 and in a fixed ditch plate 64. Shiftably mounted in the ditch plate 64 is a neutral valve NV and a shuttle valve SV (FIGS. 6 and 14).

Figure 4:
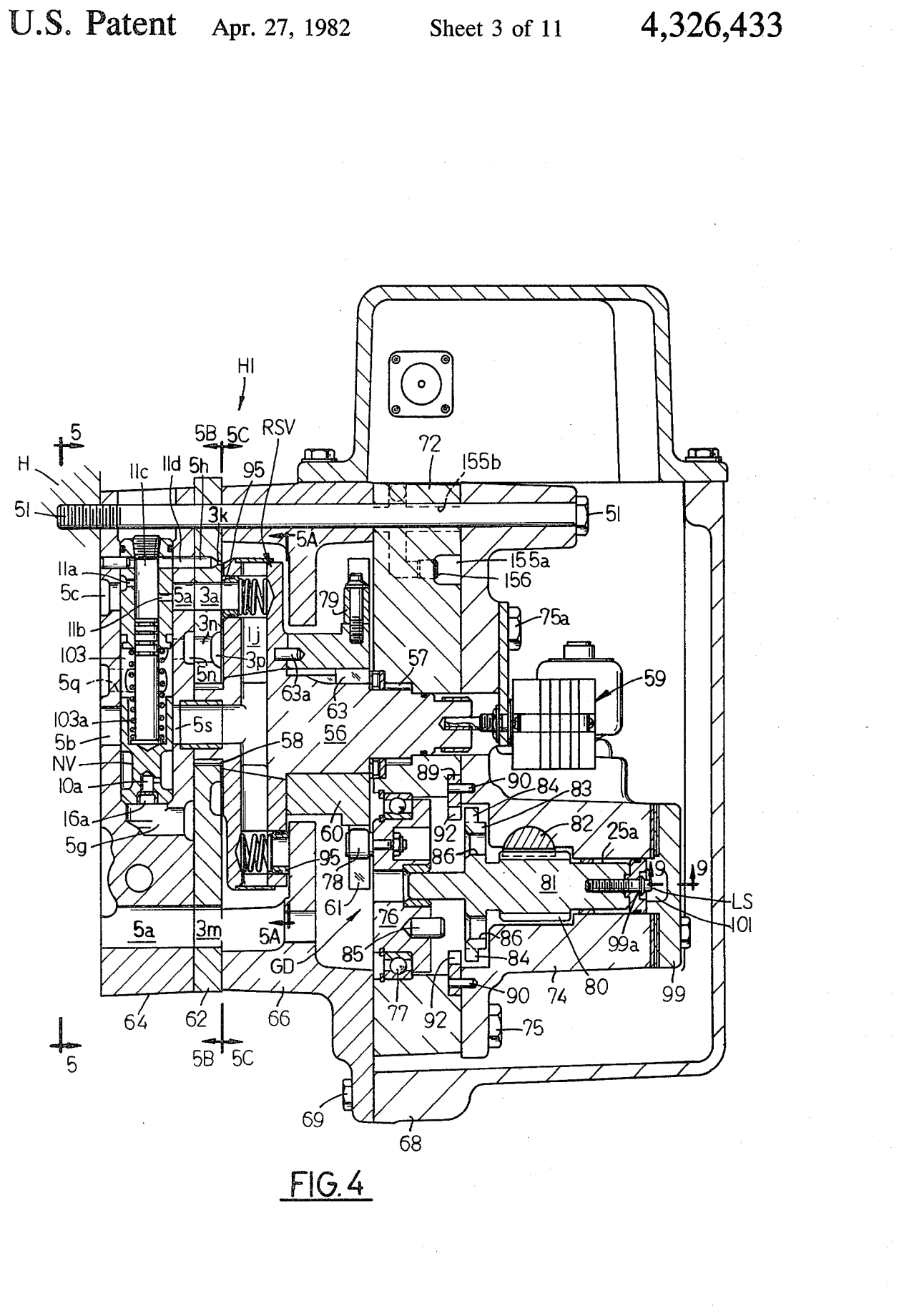

The rotary selector valve RSV is mounted in the valve body 66 and a sub-housing 68 is attached to the valve body by cap bolts 69, all as clearly shown in FIG. 4. It will be appreciated that base plate 62, ditch plate 64, valve body 66 and sub-housing 68 are all secured together to generally form the housing H1.

Pilot valve body 72 is mounted within the housing H1 together with cylinder housing 74, all being secured together and piloted by the body fitting studs. In addition to the body fitting studs the before mentioned parts are secured together by the bolts 51, 75 and 75a (FIG. 4). A geneva drive member 76 is journalled on anti-friction bearing 77 mounted in body 72 and cam followers 78 are fixed on drive member 76 and extends therefrom to be engageable in slots 61 of the geneva wheel 60. The geneva wheel 60, cam followers 78 and drive members 76 in general constitute a geneva drive GD. Spacer 79 may be secured in certain of the slots 61 to mechanically block these slots of the wheel to thereby prevent the selector valve RSV from being shifted to a speed range higher than is permitted in a specific use or from being shifted below the reverse speed range.

Figure 2:
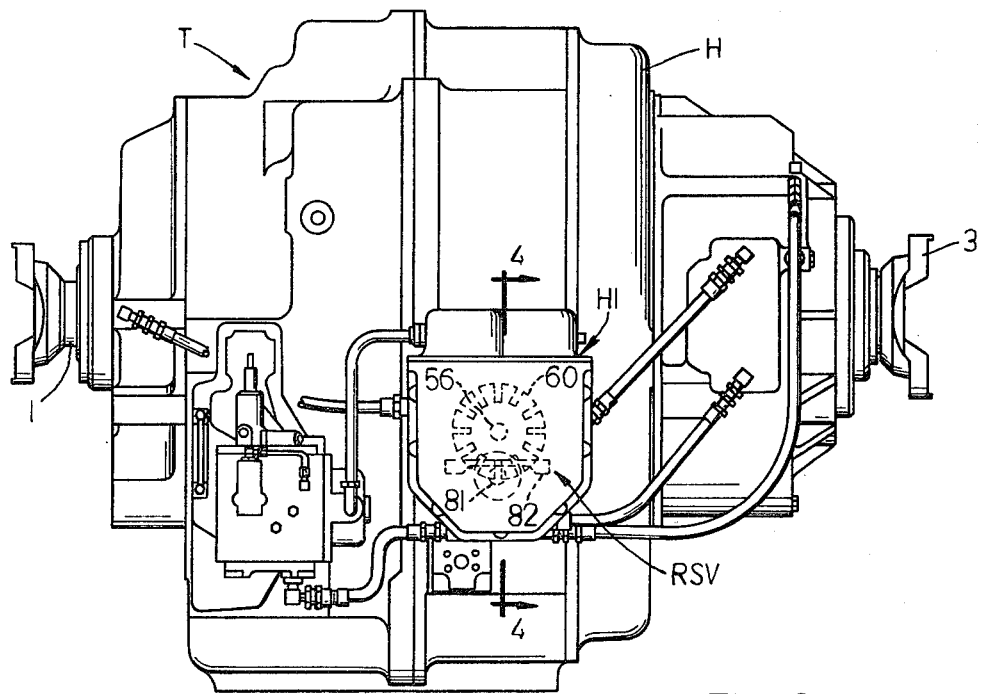
FIG. 2 is a side elevational view of the transmission assembly shown in FIG. 1.

A pinion 80 is formed integrally on its shaft 81 and is located and journalled within the housing 74. The pinion is rotated in either direction by a gear rack 82 slideably and transversely mounted in the housing 74. It should be noted that the rack shown in FIGS. 11 and 12 are located on the lower side of the pinion only for clarity in the drawings, whereas in actuality, the rack 82 is located on the top of the pinion as shown in FIGS. 2 and 4. The inner end of the shaft 81 is piloted in the rotatable geneva drive member 76.

A pair of diametrically opposed holes 86 are provided through the plate 83. Pins 85 fixed in and extending from the geneva drive member 76 are engaged by the holes 86 in plate 83 when the pinion is axially shifted inwardly. Pins 85 and holes 86 form a clutch between the gear and rack driven shaft 81 and the geneva drive GD.

Formed integrally with shaft 81 is a plate 83 having diametrically opposed lugs 84. A blocker ring plate 89 is secured by pins 90 to the inside of housing 74 and this blocker ring plate has diametrically opposed notches 92 through which the lugs 84 can axially slide when the pinion assembly is axially shifted. Alternatively, these lugs 84 are located in the notches 92 when in axial alignment therewith, to thereby prevent rotation of the pinion, as will appear. Thereby, when the rack 82 is not at either end of its stroke, the blocker ring plate 89 prevents engagement or release of the clutch formed by the pins 85 and holes 86.

The general operation of the above described components is as follows. The rotation range selector valve RSV with spring loaded face sealing wipers 95, is actuated by the rack and pinion in combination with the geneva drive GD and will only shift up or down one speed range at a time. Furthermore, the rotating range selector valve RSV will always release one range before it engages another. With the valve RSV in neutral position (FIG. 11), the apply pressure fluid opens the neutral valve NV. The pressure fluid is directed to the center of the valve RSV, then through the range selector wipers 95 to either the base plate 62 or to both the plate 62 and the selector valve body 66.

Figure 9:
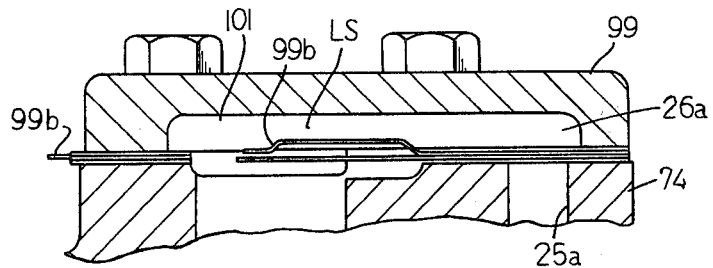
FIG. 9 is a sectional view taken generally along the line 9—9 in FIG. 4 and showing the limit switch and interconnecting passages.

The rotary range selector valve RSV is mechanically shifted by the rack and pinion, the clutch 85–86 and the geneva drive GD. The rack and pinion are actuated by two three-way solenoid valves DS, which is a down solenoid, and US which is the up solenoid with their respective pilot valves 97 and 98 (FIG. 14). The clutch 85–86 is actuated by a three way solenoid valve PPS which is a pre-positioned solenoid valve and which directs fluid to the hydraulic cylinder end cap 99 located at the end of the shaft 81. When pressure fluid is admitted to the cap cavity 101, (see FIGS. 4, 9 and 14), the shaft 81 is urged upwardly to the clutch engaged position. If the rack is not at either end of its stroke, the blocker plate prevents inward movement of the shaft and engagement of the clutch.

A limit switch LS (FIGS. 9 and 14) indicates when the clutch is returned to the outward clutch release position. Feedback from the rotary switch 59 indicates the rotary position of the valve RSV. A shuttle valve SV (FIG. 6) permits engagement of the low planetary clutch C5 when the valve RSV is in either the reverse position or the first range position, but the shuttle valve prevents the engagement of the reverse clutch CR when the valve RSV is in either first, second or third speed range position.

When the neutral valve NV is closed, none of the clutches C1, C2, C3, C4, C5, C6 and CR can be engaged regardless of the position of the range selector valve RSV. When the valve RSV is in one of the forward ranges, an electrical failure or a logic failure occurs, valve RSV retains its last position.

The neutral safety valve NSV (FIG. 14) automatically closes the neutral valve NV when the valve RSV is in the reverse position and the electric power to its solenoid is interrupted by either an electrical failure or a logic failure. When the neutral valve NV closes, a bypass valve 103 (FIG. 14) dumps the reverse clutch CR and the low planetary clutch C5.

A more detailed reference will now be made to the various fluid passages, ports and hydraulic circuit.

FIG. 14 shows the relative position of the ports in the base plate 62, the valve RSV, and the selector valve body 66 for the neutral position. The rotating range selector valve RSV distributes fluid to the base plate 62 and the selector valve body 66 from the ditch plate 64. Ports 1a, 1b and 1c in the valve RSV mate with the ports 4a, 4b and 4c in the selector valve body 66 on a sequence of 1c with 4a for first range; 1c with 4b for second range; 1c with 4c for 3rd range; 1b with 4a for fourth range, etc., for all forward ranges. The balance of the ports in the valve RSV adjacent to the selector valve body 66 mate with the surface of the selector valve body 66. Ports in the valve RSV that do not mate with a port in the selector valve body 66 are deadheaded against the face of the selector valve body 66. Ports in the selector valve body 66 that do not mate with a port in the valve RSV drain to the cavity between the valve RSV and the selector valve body 66 through the base plate port 3m, and ditch plate port 5a. Leakage is prevented between the valve RSV and the wipers 95 with O-rings and is minimized between either the base plate 62 or selector valve body 66 and the wiper with a pre-load from the springs and the applied pressure. Leakage between the base plate 62 and the geneva wheel shaft 56 is restricted with a bushing which is used as a clearance seal.

Ports 1f and 1g and stops 1d, 1e and 1h in the valve RSV mate with the ports 3a through 3j in the base plate 62 in the following sequence: For 1st range, stop 1e mates with port 3c, port 1f mates with port 3b, port 1g mates with port 3a, stop 1h mates with port 3j, and stop 1d mates with port 3d. For 2nd range, stop 1d mates with port 3e, stop 1e mates with the surface of the base plate 62, port 1f mates with port 3c, port 1g mates with port 3b and stop 1h mates with port 3a. For successive ranges the port and stops on the valve RSV would move clockwise α degrees as illustrated in FIG. 5A.

Figure 5A:
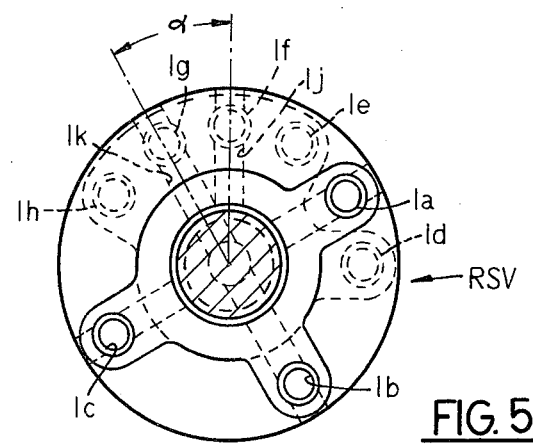
FIG. 5A is a sectional view taken generally along the line 5A—5A in FIG. 4, but on a reduced scale, and showing the face of the valve RSV which is adjacent to the selector valve body, the view being schematic in nature and primarily showing the ports and passages and not showing bolt holes.
Figure 5B:
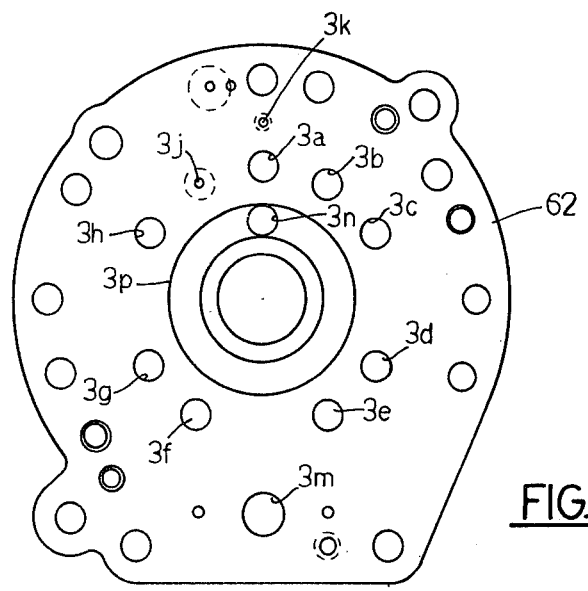
FIG. 5B is a view taken generally along the line 5B—5B in FIG. 4, but on a reduced scale, and showing the face surface of the base plate which is adjacent to the valve RSV.
Figure 5C:
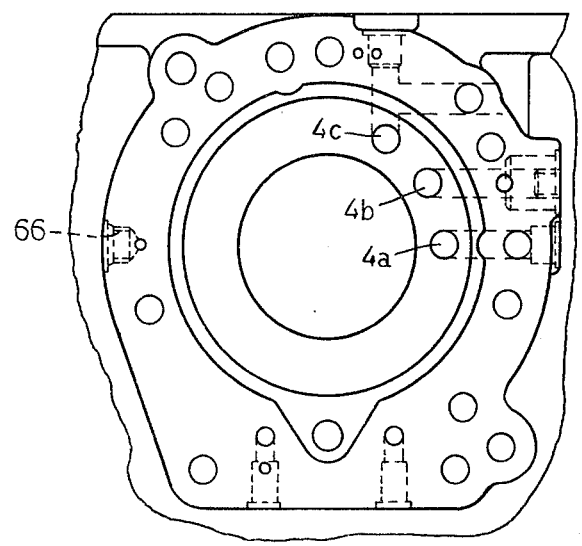
FIG. 5C is a view taken generally along the line 5C—5C in FIG. 4, but on a reduced scale and showing the face of the selector valve body which is adjacent to the valve RSV, the view being generally schematic and primarily showing the portion for the pressure fluid.
Figure 7:
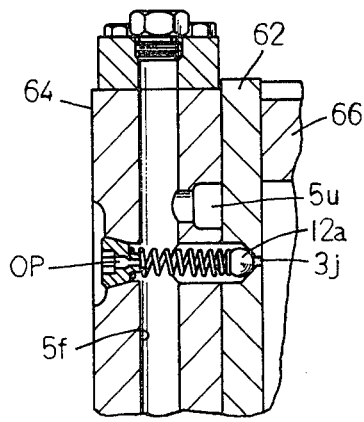
FIG. 7 is a sectional view taken along the line 7—7 in FIG. 5 and showing the check valve with an orifice, orifice plug, and interconnecting passages.
Figure 8:
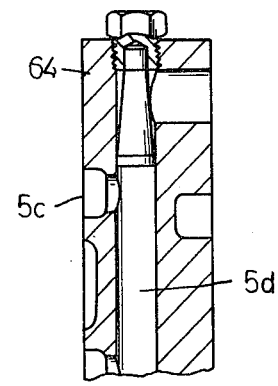
FIG. 8 is a sectional view taken along the line 8—8 in FIG. 5 and showing the screen filter and interconnecting passages.

To open the neutral valve NV, the valve RSV has to be positioned relative to the base plate 62, as shown in FIGS. 5A and 5B. Fluid is supplied to the device at port 5b and flows along passage 5d (FIG. 8) to port 5c. Then it flows through the orifices 11a and 11b, passages 5e, ports 3a and 1f, passages 1j and 1k, port 1g, port and orifice 3j, check valve ball 12a (FIG. 7), passages 5f and 5g. The neutral valve NV is opened by the pressure at passage 5g, compressing the spring 103a. The plunger 104 closes off orifices 11a and 11b and thus prevents excess leakage when the valve RSV is not in the neutral or 1st range position. Passages 11d, 5h and 3k vent passage 11c to drain thus preventing the plunger 104 from deadheading the fluid in the passage 11c.

When the neutral valve NV is closed and the valve RSV is in the 1st range position, the engagement of the 1st range clutches C1 and C5 are prevented by the bypass valve 103. To bypass the flow from port 3b, the fluid flows through passages 5j, 15a, 5k, 5m, 5n, 5p, 5q, 5r and 3n to annulus 3p and finally to drain 3m. *When the neutral valve NV is open, it closes passage 5q* thus closing the bypass valve 103 and allowing the pressurization of ports 3b and 3c.

The neutral valve NV closes when the pressurized fluid is removed from passage 5g. When the supply pressure to port 5b is removed, fluid leaks between the bushing and geneva wheel shaft 56 and reduces the pressure at passage 5s. With reduced pressure at passage 5s, the fluid flows from passage 5g through orifice plug 16a and passage 10a to passage 5s. When the pressure in passage 5g drops below the pressure on the neutral valve NV from the spring 103a, the neutral valve NV closes.

Figure 10:
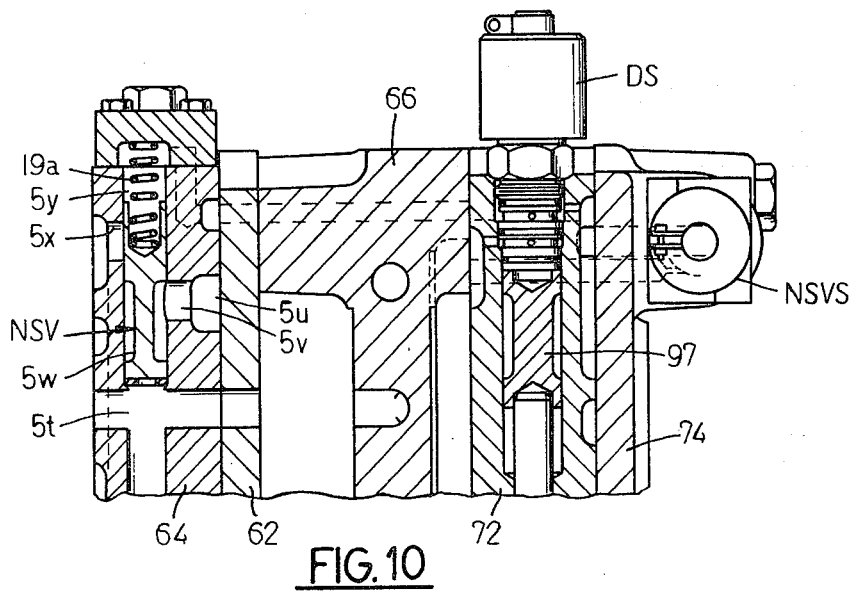
FIG. 10 is a sectional view taken along the line 10—10 in FIG. 5 and showing the neutral safety valve and its solenoid, the pilot valve and its downshift solenoid, and interconnecting passages.
Figure 13:
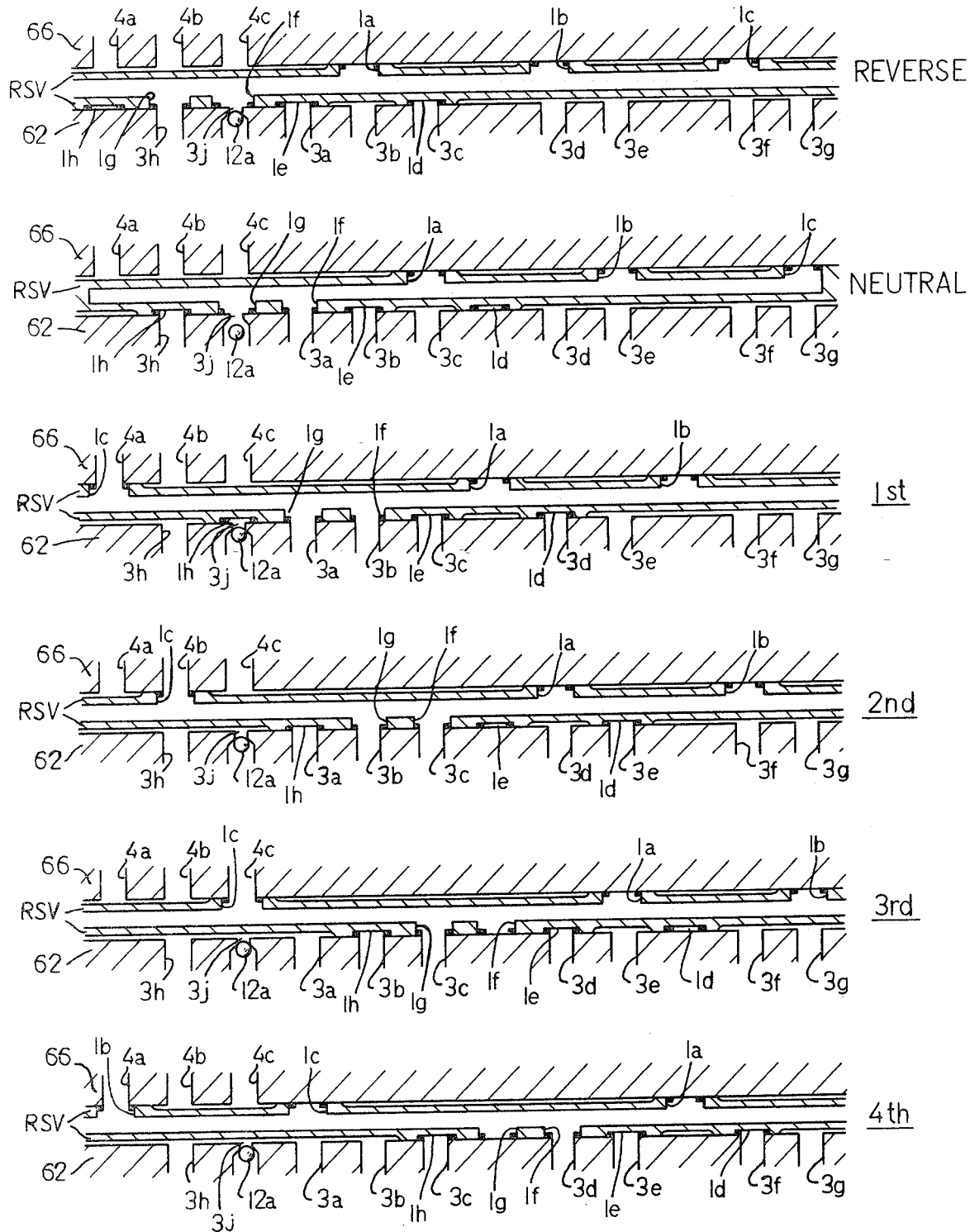
FIGS. 13 and 13a are schematic views that show the relative positions of the hydraulic ports in the base plate, the range selector valve and the selector valve body for the various speed range positions.
Figure 13A:
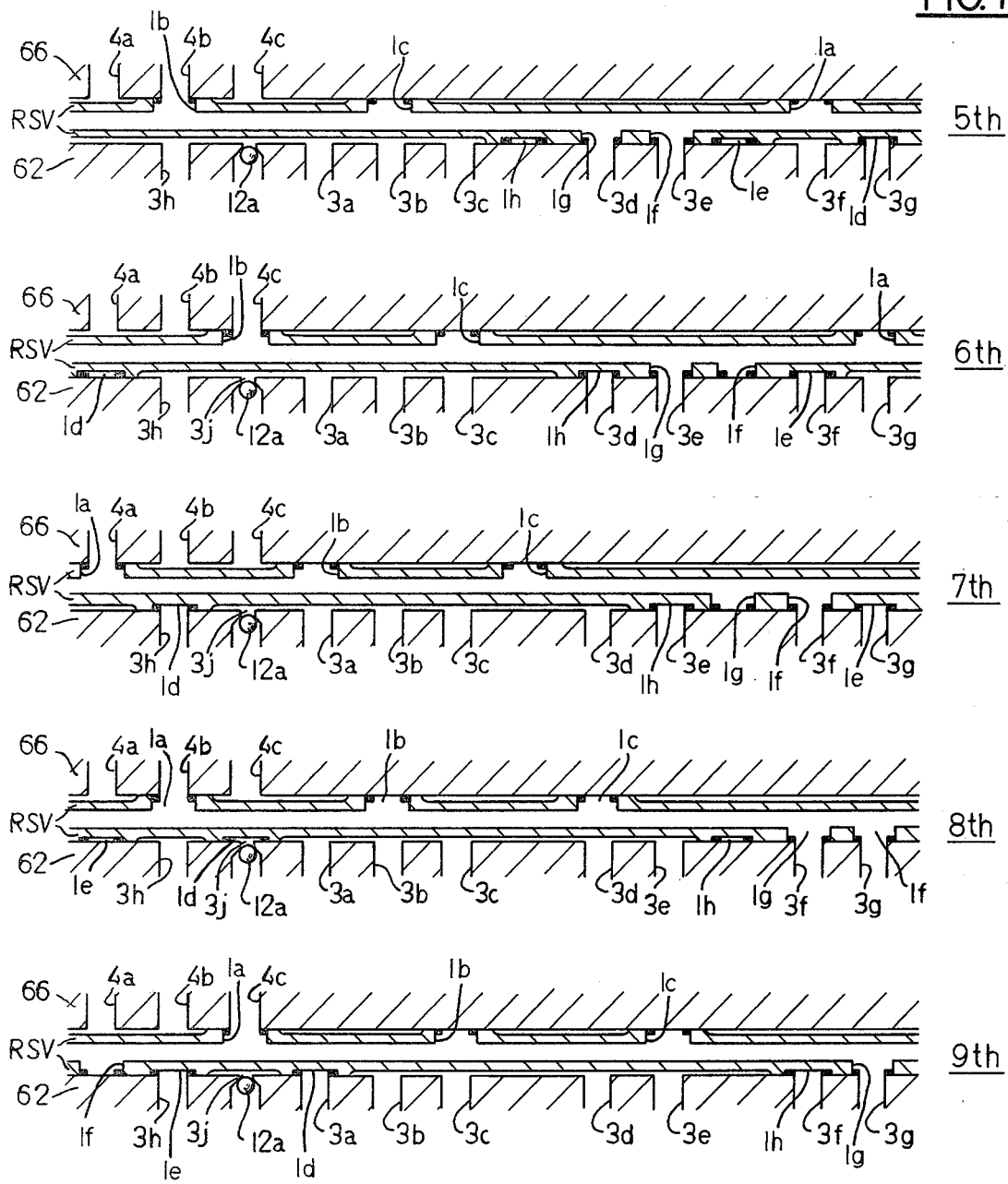

In case of an electrical power or logic failure when the valve RSV is in a forward range the neutral safety valve NSV (FIGS. 10 and 14) remain closed when solenoid NSVS is de-energized because the pressure at passage 5t has been dumped to drain and therefore it is insufficient to shift the neutral safety valve NSV against the spring to the open position.

In case of an electrical power or logic failure when the valve RSV is in the reverse position the neutral safety valve NSV dumps the pressurized fluid in passage 5g to drain. To dump the pressurized fluid in passage 5g the fluid flows through the passages 5f, 5u and 5v, the cavity 5w, and the passage 5x to drain. For the fluid to flow through the cavity 5w, the neutral safety valve NSV is shifted by the pressure in passage 5t which flows through the expansion plug orifice OP. For the pressure at orifice OP to shift the neutral safety valve NSV, the pressurized fluid in passage 5y needs to be lower than the pressure at passage 5t less the spring pressure from spring 19a. To lower the pressure at passage 5y a solenoid NSVS is de-energized and allows the fluid to flow from passage 5y by way of interconnecting passage to drain. As the pressure is dropped in passages 5u and 5g the neutral valve NV closes. After the neutral valve NV closes, the bypass valve dumps the reverse clutch CR and the low planetary clutch C5. After the reverse clutch has dumped the pressure at passage 5t drops and the neutral safety valve NSV closes due to the spring force from the spring 19a, and half of the main pressure in passage 5y. When the electrical power is restored to solenoid NSVS, the neutral valve NV remains closed and prevents the engaging of the reverse clutch and low planetary clutch C5. An orifice plug OP (FIG. 7) bleeds off any leakage from around the neutral valve NV which prevents pressurizing of passage 5g and opening of the neutral valve NV. To engage the reverse clutch and the low planetary, the valve RSV must first be shifted to neutral to open the neutral valve, and then to the reverse position to pressurize the reverse clutch and the low planetary.

When the solenoid NSVS is energized, fluid flows from passage 155a through orifice plug 156 and passages 155b, 4d, 3q, 5aa, 57a to passage 5y which is restored to full pressure. With passage 5y pressurized and spring 19a force applied, the neutral safety valve NSV remains closed.

Since the reverse drive train uses the same planetary clutch as the 1st, 2nd and 3rd forward ranges, a shuttle valve SV (FIG. 6) is used between passages 5j, 5k and 5z to direct the pressurized fluid to the correct port. The shuttle valve permits engaging of the reverse clutch and the low planetary clutch when the valve RSV is in the reverse position and blocks the flow of fluid out of passage 5j while stop 1d blocks the flow of fluid out of port 3c. The shuttle valve permits the engaging of the low planetary clutch C5 when the valve RSV is in the 1st, 2nd or 3rd range position without engaging the reverse clutch CR.

To up-shift the valve RSV, the down-shift solenoid DS is energized, the pilot valve 97 (FIG. 14) is shifted, pressurized fluid shifts the rack 82. The pre-positioning solenoid PPS is energized, pressurized fluid flows through passage 25a to the cylinder end cap 99 and passage 26a. As passage 26a is being pressurized, pinion 80 is pushed axially, the lugs 85 on the pinion pass through the block plate 89, the holes 86 in the pinion slide over the dowel pins 85 until the pinion 80 rests against the geneva drive member 76. The down-shift solenoid DS is de-energized and the up-shift solenoid US is energized, the pilot valve 98 is shifted, pressurized fluid shifts the rack 82, which rotates the pinion 80 and the geneva drive GD 180°. At the same time that the rack shifts, a cam follower 78 applies force to one side of the slot 61 in the geneva wheel 60, and rotates the valve RSV α degrees. Since the geneva wheel 60 is connected to and indexed with the geneva wheel shaft 56 with the key 63, and with the valve RSV with the dowel pin 63a, the valve RSV shifts from one port to the next port and the geneva wheel shaft rotates the rotary switch 59 (FIG. 4) to the next range position. The rotary switch provides feedback to the controller EC in FIG. 15 and tells it what range the valve RSV is in. The pre-positioning solenoid PPS is de-energized, the return pressure cylinder 25b disengages the pinion 80 from the geneva drive 76. When the pinion has completely returned to the release position, it stops against the cylinder end cap 99 and an insulator screw 99a pushes the limit switch LS plunger (FIG. 9) against the limit switch terminal 99b. The limit switch LS is used to see that the pinion 80 is disengaged from the geneva drive GD before the down-shift solenoid DS is energized for an up-shift or the up-shift solenoid US is energized for a down-shift. To test that the limit switch LS is working properly, the limit switch LS must be open before the up-shift solenoid US is energized on an up-shift or the down-shift solenoid DS is energized on a down-shift. The limit switch LS is insulated from the cylinder housing and cylinder end cap 99 by conventional gaskets.

The valve RSV is held in position by the cam follower on the geneva drive and the geneva drive GD is held in angular position by a ball detent 31b (FIG. 6) that is spring-loaded against the detent slots 31a.

The blocker plate 89 prevents the engaging or the releasing of the pinion 80 when the rack 82 is not at either end of its stroke.

To down-shift the valve RSV, the procedure is the same as for an up-shift except the sequence of energizing the solenoids. The down-shift sequence is to energize the up-shift solenoid US, to energize the pre-positioning solenoid PPS, to de-energize the up-shift solenoid US, to energize the down-shift solenoid DS, to de-energize the pre-positioning solenoid PPS, and to de-energize the down-shift solenoid DS.

We claim:

1. A hydraulically controlled transmission having a plurality of selectively engagable change speed gears and also having hydraulically actuated friction type clutches for selectively engaging said gears to thereby provide various speed ratios for said transmission, a hydraulic control circuit in fluid communication with said clutches, a rotary range selector valve in said circuit for distributing pressure fluid to said clutches for actuation thereof, drive means for rotatably driving said rotary selector valve in step-by-step increments whereby said transmission can only be shifted one speed range at a time and an engaged speed range will be released before another speed range is selected, and means for preventing actuation of said selector valve for a range change when said drive means is not in a predetermined position.

2. The transmission set forth in claim 1 further characterized in that said drive means includes a rotary geneva wheel secured to said range selector valve for rotation therewith and geneva drive means for rotating said geneva wheel in step-by-step increments.

3. A hydraulically controlled transmission having a plurality of selectively engagable change speed gears and also having hydraulically actuated friction type clutches for selectively engaging said gears to thereby provide various speed ratios for said transmission, a hydraulic control circuit in fluid communication with said clutches, a rotary range selector valve in said circuit for distributing pressure fluid to said clutches for actuation thereof, and drive means for rotatably driving said rotary selector valve in step-by-step increments whereby said transmission can only be shifted one speed range at a time and an engaged speed range will be released before another speed range is selected, said drive means including a rotary geneva wheel secured to said range selector valve for rotation therewith, geneva drive means for rotating said geneva wheel in step-by-step increments, rack and pinion means for rotating said geneva drive means in either direction of rotation, and including blocker means for preventing rotation of said geneva drive and consequent actuation of said selector valve for a range change when said rack and pinion means is not in a predetermined position.

4. The transmission set forth in claim 3 including an electrical switch that provides an electrical feedback signal for a controller when said rack and pinion means is in the clutch released position.

5. The transmission set forth in claim 4 including a neutral valve in said hydraulic circuit and shiftable between open and closed positions and which prevents said clutches from becoming engaged when in the closed position regardless of the position of the range selector valve.

6. A hydraulically controlled transmission for a vehicle and comprising, a plurality of selectively engagable change speed gears, hydraulically actuated friction type clutches for selectively engaging said gears to thereby provide various forward speed ranges and a reverse range for said transmission, a hydraulic control circuit in fluid communication with said clutches, a rotary range selector valve in said circuit for distributing pressure fluid to said clutches for actuation thereof, and drive means for rotatably driving said rotary selector valve in step-by-step increments whereby said transmission can only be shifted one speed range at a time and an engaged speed range will be released before another speed range is selected, said drive means including a rotary geneva wheel secured to said range selector valve for rotation therewith, and geneva drive means including rack and pinion means for rotating said geneva wheel in step-by-step increments, and blocking means for preventing rotation of said geneva drive when said rack and pinion means is not at either end of its travel, and a neutral valve in said hydraulic circuit and shiftable between open and closed positions and when in the closed position prevents said clutches from becomng engaged regardless of the position of the range selector valve.

7. The transmission set forth in claim 6 including an up-shift electrically operated solenoid valve, a down-shift electrically operated solenoid valve and a pre-positioning electrically operated solenoid valve in said hydraulic circuit and for shifting said rack and pinion means in opposite directions and an electric rotary switch connected with said selector valve assembly for indicating the rotary position of said selector valve to a controller.

8. The transmission set forth in claim 6 further characterized in that said circuit includes a neutral safety electrically operated solenoid valve (NSVS) and a neutral safety valve (NSV) in said hydraulic circuit, said solenoid valve (NSVS) arranged whereby it does not open said neutral safety valve when said selector valve is in any of the said forward ranges, but does open said neutral safety valve when said selector valve is in said reverse range and an electrical or logic failure occurs, and whereby when said neutral safety valve is opened said neutral valve closes causing said clutches to release, thereby stopping transmission of the power to the output of said transmission.

* * * * *